June 16, 1931.   A. L. DOLD   1,810,268
HOSE COUPLING
Filed Aug. 16, 1928
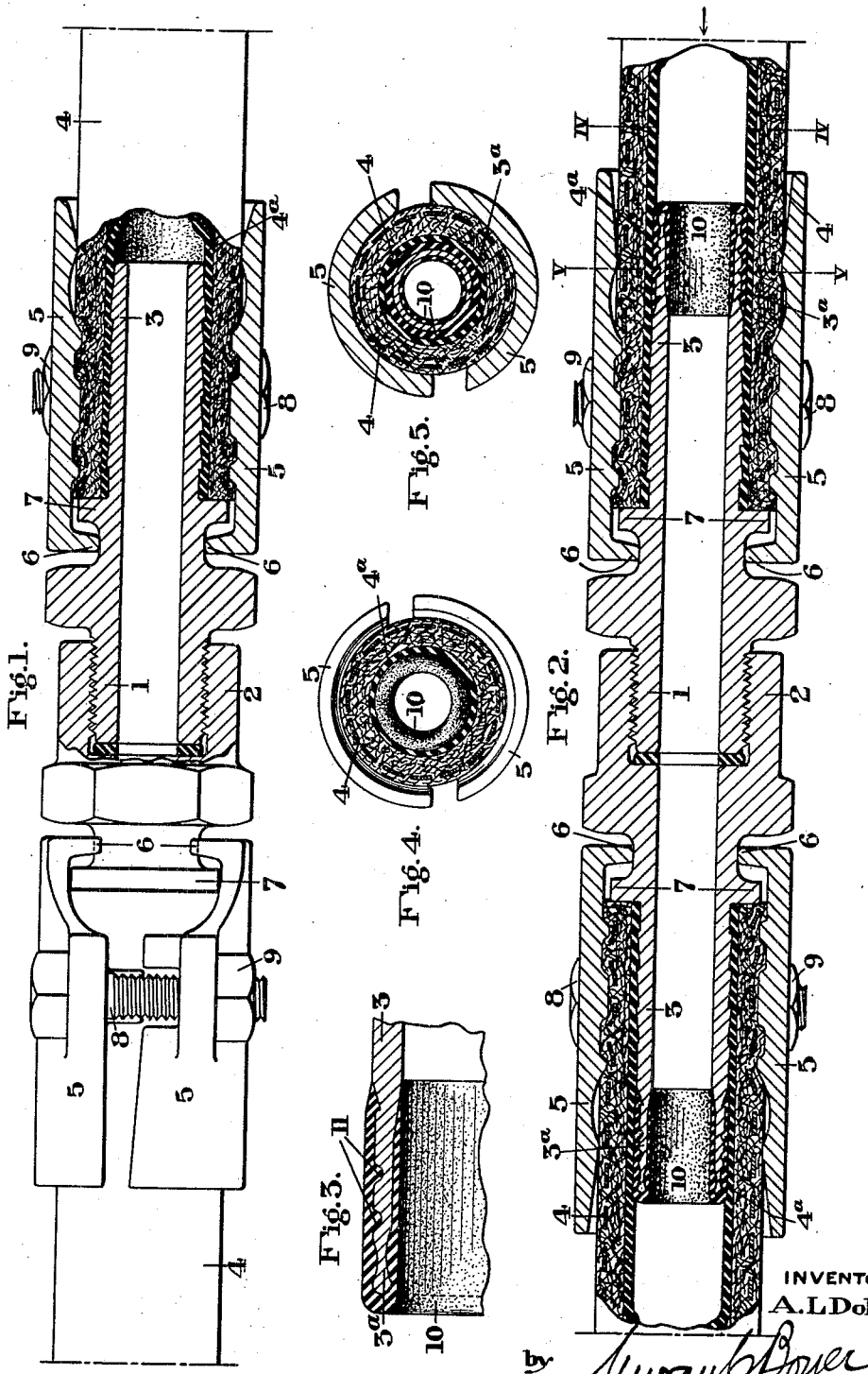
INVENTOR:
A. L. Dold,
by Murray C. Boyer
Atty Patented June 16, 1931

1,810,268

UNITED STATES PATENT OFFICE

ALFRED L. DOLD, OF DREXEL HILL, PENNSYLVANIA

HOSE COUPLING

Application filed August 16, 1928. Serial No. 300,086.

My invention relates to couplings employed for connecting sections of hose, and one object of my invention is to provide the ends of the shank or stem portions of such couplings, inserted in the ends of the hose sections, with protective cushioning or padding means insuring tight contact with the rubber or other lining of the hose and completely closing any space or gap that may exist between such shank or stem and the lining of the hose.

A further object of my invention is to provide the shank or stem of a hose coupling with a cushion or protective pad of elastic or other suitable material lying between the end of such shank or stem and the inner elastic lining of the hose in order that all danger of injury to such inner surface of the hose at the point or zone where such inner surface would normally be in contact with said shank or stem of the coupling will be eliminated; such pad or cushion being particularly valuable in protecting the hose from possible cutting by the end of such shank or stem should the hose be bent close to the coupling.

A further object of my invention is to dispose such protective pad or cushion within the end of the clamping members of the coupling which serve to prevent the extreme bending of the hose adjacent to the end of said shank or stem.

A further object of my invention is to provide a protecting pad or covering of material that will adhere to the rubber or other lining of the hose and prevent the material, liquid or otherwise, passing through the hose entering between such shanks or stems and the inner surface or lining of the hose.

These and other features of my invention are more fully described hereinafter; reference being had to the accompanying drawings, in which:

Figure 1 is a sectional elevation of one form of hose coupling of usual or ordinary type.

Fig. 2 is a similar view of a hose coupling showing the ends of the shanks or stems of the coupling members equipped with protective cushions or pads within the scope of my invention.

Fig. 3 is an enlarged sectional view of a portion of the structure shown in Fig. 2, and Figs. 4 and 5 are cross sectional views on the lines IV—IV and V—V, Fig. 2.

My invention, though not limited thereto, has been designed for use with and is particularly applicable to couplings employed for connecting heavy sections of hose subject to extreme pressure in moving liquids and other fluid bodies, such as mine water, usually accompanied by mud, small stones, gravel and/or the like, whereby the hose lining is subjected to excessive wear.

No matter how tightly the externally applied clamping members may grip the hose, there is a slight gap between the end of the shank or stem and the inner wall of the hose, which wall is usually of rubber or of some rubber composition or material. The external wall of the shank or stem is usually grooved or recessed to provide a corrugated surface, or otherwise shaped to insure embedment in the softer lining of the hose in order that the hose section may be tightly clamped to said shank or stem. But no matter how tightly the clamping means may be applied it is practically impossible to embed the end of the shank or stem in the inner wall of the hose and the space left permits the material passing through the hose to enter between the hose wall and the shank or stem of the coupling and in time load up with dirt, pebbles and/or the like accompanying the material passing through the hose, with the result that the great pressure involved in moving such material through the hose tends to burst the same and destruction of the hose occurs at the joints directly adjacent the end of the shanks or stems of the coupling members.

The object of my invention is to avoid this difficulty by providing means which entirely close any gap that may be present between the ends of said shanks or stems and the inner walls of the hose and for this purpose I provide the end of each shank or stem with a boot or shoe which may be composed of rubber, fabric, or a combination of rubber and fabric, leather, or any material, or combination of materials, or composition of matter which, in its finished state, will be softer than the metal shank or stem over which it is applied.

I have discovered that the employment of a soft shoe or lining interposed between the ends of the coupling shanks or stems and the inner wall of the hose sections prevents the entrance of the passing fluid or its constituents between said shanks or stems and the hose lining and prevents damage to or rupture of the hose heretofore common at a point directly adjacent the hose coupling. In use it is necessary that the hose be bent or twisted and many of the bends occur directly at the couplings. By interposing the protective pad or cushion between the inner elastic lining of the hose and the stem or shank of the coupling and particularly at the end of the same, an increased amount of elastic material is provided which protects the elastic lining of the hose and prevents the shank or stem cutting through the some. Once such lining is cut, the material passing through the hose finds egress through such cut and rapid destruction of the hose ensues.

In Figure 1 of the drawings, 1 and 2 represent the complemental parts of a hose coupling, each of which is provided with a shank or stem 3, adapted to enter the ends of the hose sections indicated at 4. These hose sections may be of any usual construction, having a lining 4ª of rubber or similar elastic material. Clamping means are applied externally of the hose sections and such clamping means may be of the type or substantially like that illustrated in the patent of J. F. W. Jost, No. 953,422, dated March 29, 1910; comprising a pair of substantially half-round sections 5, substantially fitting the external wall of the hose, and having lugs or lips 6, disposed in engagement with annular shoulders 7, carried by the shanks or stems 3. As ordinarily constructed and arranged, and as indicated in the drawings, the shanks or stems 3 are simply inserted in the ends of the hose sections and the external clamping means applied; such clamping means being retained by suitable means such as the bolts 8 and nuts 9.

In the form of coupling shown in Fig. 2 the shanks or stems are somewhat longer than those illustrated in Fig. 1; having integral extensions 3ª, and these extensions receive a protective sheath, cushion or pad in the form of a boot or shoe of rubber or other suitable material such as above-mentioned, such boot or shoe being indicated at 10, and shown as embedded in the elastic wall 4ª of the hose sections. The ends of the clamps 5 of the coupling members may extend beyond the ends 3ª of the shanks or stems 3 and the protective sheaths 10 covering the same and prevent the extreme bending of the hose. When any such bending occurs adjacent the couplings, the protective pad or sheath covering said extended ends 3ª provides an additional cushion between the metal of the shank and the inner elastic wall of the hose and prevents the shank or stem cutting into such elastic lining or wall. The extended ends 3ª of the shanks or stems 3 may be grooved or recessed at 11 to provide a corrugated surface, or otherwise shaped for the purpose of holding such boots or shoes in place or, if desired, such extended ends may be smooth inside and/or outside, as the case may be, all of which is within the scope of my invention.

In applying the protective means to the ends of the shanks or stems, I may coat the latter with some form of adhesive material, glue, rubber cement, a resinous or synthetic varnish, or any suitable body of a similar nature designed to effect a tight connection with such shanks or stems, and when the latter are inserted in the ends of the hose sections, the surface of such protective boot or shoe may be coated with similar material in order that it may adhere to and in some instances cohere with the elastic material forming the inner wall of such hose sections.

While the inner wall of the protective boot or shoe may be worn away by the passing current of material, such wear will not extend beyond the ends of the shanks or stems 3ª, and in practice the latter will be so embedded in the boot or shoe, and the boot or shoe so associated with the inner wall of the hose that all danger of the passing fluid or any of its suspended material entering the space between the inner wall of the hose and the shanks or stems of the coupling members will be prevented.

Practice has proven that the life of hose equipped with coupling members having their shanks or stems provided with the protective means forming the subject of my invention have been materially prolonged. While I prefer to provide a double-walled boot or shoe; a wall whose cross section is substantially U-shape, as indicated in the drawings, I may provide a sheath which is applied externally at the ends of the shanks or stems of the coupling members and is provided with a flange overlying such ends, without departing from my invention.

While I have illustrated in the accompanying drawings one form of sheath or shoe for the ends of the shanks or stems of hose coupling members, I do not wish to be limited to the size, shape, or other feature of construction, or the character of the material employed, which may be changed to suit varying conditions met in practice; the essential condition being that such sheath or shoe shall be softer than the ends of the shanks or stems and of a nature that will permit close association with and embedment in the elastic wall lining the hose sections. This sheath or shoe makes a tight, close joint at the ends of the shanks or stems between the same and the inner wall of the hose and completely closes any gap or recess that may exist between said inner wall and said shanks or stems at the ends of the latter.

I claim:

The combination of a hose section, a coupling shank or stem inserted therein; said shank or stem having its free end reduced internally and externally, and a double-walled sheath of relatively soft material enclosing the reduced end of said shank or stem and having a portion interposed between the same and the inner wall of the hose; the bore of the inner portion of said sheath having the same diameter as the bore of the shank or stem.

In witness whereof I have signed this specification.

A. L. DOLD.